US008239828B2

(12) United States Patent
Liu et al.

(10) Patent No.: US 8,239,828 B2
(45) Date of Patent: Aug. 7, 2012

(54) METHOD OF RECOVERING FROM SOFTWARE FAILURES USING REPLANNING

(75) Inventors: Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 11/971,056

(22) Filed: Jan. 8, 2008

(65) Prior Publication Data

US 2009/0177910 A1 Jul. 9, 2009

(51) Int. Cl.
*G06F 9/44* (2006.01)

(52) U.S. Cl. ........ 717/120; 717/110; 717/124; 717/126; 717/132; 714/38.1; 714/2; 714/4.2

(58) Field of Classification Search .................. 717/120, 717/124
See application file for complete search history.

(56) References Cited

U.S. PATENT DOCUMENTS

| | | | |
|---|---|---|---|
| 4,571,678 A | 2/1986 | Chaitin | |
| 5,187,788 A | 2/1993 | Marmelstein | |
| 5,659,754 A | 8/1997 | Grove et al. | |
| 5,675,757 A | 10/1997 | Davidson et al. | |
| 5,675,805 A | 10/1997 | Boldo et al. | |
| 5,696,693 A * | 12/1997 | Aubel et al. | 716/119 |
| 5,937,195 A | 8/1999 | Ju et al. | |
| 5,999,729 A * | 12/1999 | Tabloski et al. | 717/105 |
| 6,032,142 A * | 2/2000 | Wavish | 706/47 |
| 6,053,951 A | 4/2000 | McDonald et al. | |
| 6,339,783 B1 | 1/2002 | Horikiri | |
| 6,347,320 B1 | 2/2002 | Christensen et al. | |
| 6,430,698 B1 * | 8/2002 | Khalil et al. | 714/4.1 |
| 6,601,112 B1 * | 7/2003 | O'Rourke et al. | 719/312 |
| 6,665,863 B1 | 12/2003 | Lord et al. | |
| 6,721,747 B2 | 4/2004 | Lipkin | |
| 6,792,595 B1 | 9/2004 | Storistenau et al. | |
| 6,799,184 B2 | 9/2004 | Bhatt et al. | |
| 6,813,587 B2 * | 11/2004 | McIntyre et al. | 702/183 |
| 6,891,471 B2 | 5/2005 | Yuen et al. | |
| 6,983,446 B2 | 1/2006 | Charisius et al. | |
| 7,062,762 B2 | 6/2006 | Krishnamurthy et al. | |
| 7,103,873 B2 | 9/2006 | Tanner et al. | |
| 7,164,422 B1 | 1/2007 | Wholey, III et al. | |
| 7,174,536 B1 | 2/2007 | Kothari et al. | |
| 7,231,632 B2 | 6/2007 | Harper | |
| 7,263,694 B2 | 8/2007 | Clewis et al. | |
| 7,290,244 B2 | 10/2007 | Peck et al. | |
| 7,334,216 B2 | 2/2008 | Molina-Moreno et al. | |
| 7,409,676 B2 * | 8/2008 | Agarwal et al. | 717/120 |
| 7,426,721 B1 | 9/2008 | Saulpaugh et al. | |
| 7,466,810 B1 * | 12/2008 | Quon et al. | 379/201.01 |

(Continued)

OTHER PUBLICATIONS

Titel: An additive reliability model for the analysis of modular software failure data, author: Xie et al , source: IEEE, dated: Oct. 24, 1995.*

(Continued)

*Primary Examiner* — Chameli Das
(74) *Attorney, Agent, or Firm* — William J. Stock; F. Chau & Associates, LLC

(57) ABSTRACT

A method for recovering from software failures, includes: receiving failure information that identifies a failing component of a first processing graph; modifying a planning domain that includes a plurality of component descriptions according to the failure information; and composing a second processing graph by using the modified planning domain so that the second processing graph does not include the failing component.

16 Claims, 6 Drawing Sheets

U.S. PATENT DOCUMENTS

| | | | |
|---|---|---|---|
| 7,472,379 | B2 | 12/2008 | Chessell et al. |
| 7,499,906 | B2 | 3/2009 | Kloppmann et al. |
| 7,536,676 | B2 | 5/2009 | Baker et al. |
| 7,543,284 | B2 | 6/2009 | Bolton et al. |
| 7,565,640 | B2 | 7/2009 | Shukla et al. |
| 7,614,041 | B2 | 11/2009 | Harper |
| 7,627,808 | B2 | 12/2009 | Blank et al. |
| 7,639,726 | B1 | 12/2009 | Sinsuan et al. |
| 7,657,436 | B2 | 2/2010 | Elmore et al. |
| 7,681,177 | B2 | 3/2010 | LeTourneau |
| 7,685,566 | B2 | 3/2010 | Brown, Jr. et al. |
| 7,716,167 | B2 | 5/2010 | Colossi et al. |
| 7,716,199 | B2 | 5/2010 | Guha |
| 7,730,467 | B1 | 6/2010 | Hejlsberg et al. |
| 7,756,855 | B2 | 7/2010 | Ismalon |
| 7,769,747 | B2 | 8/2010 | Berg et al. |
| 7,773,877 | B2* | 8/2010 | Yang et al. ............... 398/10 |
| 7,792,836 | B2 | 9/2010 | Taswell |
| 7,797,303 | B2 | 9/2010 | Roulland et al. |
| 7,809,801 | B1 | 10/2010 | Wang et al. |
| 7,810,085 | B2 | 10/2010 | Shinnar et al. |
| 7,814,123 | B2 | 10/2010 | Nguyen et al. |
| 7,827,210 | B2 | 11/2010 | Meliksetian et al. |
| 7,860,863 | B2 | 12/2010 | Bar-Or et al. |
| 7,861,151 | B2 | 12/2010 | Milic-Frayling et al. |
| 7,877,387 | B2 | 1/2011 | Hangartner |
| 7,882,485 | B2* | 2/2011 | Feblowitz et al. .......... 717/104 |
| 7,886,269 | B2 | 2/2011 | Williams et al. |
| 7,886,273 | B2* | 2/2011 | Hinchey et al. .......... 717/124 |
| 7,900,201 | B1* | 3/2011 | Qureshi et al. .......... 717/174 |
| 7,954,090 | B1* | 5/2011 | Qureshi et al. .......... 717/127 |
| 7,958,148 | B2 | 6/2011 | Barnes et al. |
| 7,982,609 | B2 | 7/2011 | Padmanabhan et al. |
| 7,984,417 | B2 | 7/2011 | Ben-Zvi et al. |
| 7,984,423 | B2 | 7/2011 | Kodosky et al. |
| 7,992,134 | B2* | 8/2011 | Hinchey et al. .......... 717/126 |
| 8,001,527 | B1* | 8/2011 | Qureshi et al. .......... 717/120 |
| 8,032,522 | B2 | 10/2011 | Goldstein et al. |
| 8,037,036 | B2 | 10/2011 | Blumenau et al. |
| 8,046,737 | B2 | 10/2011 | Wittenberg et al. |
| 8,078,487 | B2 | 12/2011 | Li et al. |
| 8,078,953 | B2 | 12/2011 | Kunz et al. |
| 8,086,598 | B1 | 12/2011 | Lamb et al. |
| 8,122,006 | B2 | 2/2012 | de Castro Alves et al. |
| 2002/0109706 | A1 | 8/2002 | Lincke et al. |
| 2004/0015783 | A1 | 1/2004 | Lennon et al. |
| 2004/0249664 | A1 | 12/2004 | Broverman et al. |
| 2005/0096960 | A1 | 5/2005 | Plutowski et al. |
| 2005/0097224 | A1 | 5/2005 | Chen et al. |
| 2005/0125738 | A1 | 6/2005 | Srivastava et al. |
| 2005/0125739 | A1 | 6/2005 | Thompson et al. |
| 2005/0159994 | A1 | 7/2005 | Huddleston et al. |
| 2005/0172306 | A1* | 8/2005 | Agarwal et al. ........... 719/328 |
| 2005/0177406 | A1 | 8/2005 | Facciorusso et al. |
| 2005/0192870 | A1 | 9/2005 | Geddes |
| 2006/0212836 | A1 | 9/2006 | Khushraj et al. |
| 2007/0033590 | A1 | 2/2007 | Masuouka et al. |
| 2007/0043607 | A1 | 2/2007 | Howard et al. |
| 2007/0112777 | A1 | 5/2007 | Field et al. |
| 2007/0136281 | A1 | 6/2007 | Li et al. |
| 2007/0190499 | A1 | 8/2007 | Baur |
| 2007/0204020 | A1 | 8/2007 | Anderson et al. |
| 2007/0208685 | A1 | 9/2007 | Blumenau |
| 2007/0244912 | A1 | 10/2007 | Kawaguchi |
| 2007/0245298 | A1* | 10/2007 | Grabarnik et al. ......... 717/104 |
| 2007/0250331 | A1 | 10/2007 | Liu et al. |
| 2007/0282746 | A1 | 12/2007 | Anke et al. |
| 2008/0065455 | A1 | 3/2008 | Sun et al. |
| 2008/0086485 | A1 | 4/2008 | Paper |
| 2008/0140778 | A1 | 6/2008 | Banavar et al. |
| 2008/0168529 | A1* | 7/2008 | Anderson et al. .......... 726/1 |
| 2008/0243484 | A1 | 10/2008 | Mohri et al. |
| 2009/0070165 | A1 | 3/2009 | Baeuerle et al. |
| 2009/0100407 | A1 | 4/2009 | Bouillet et al. |
| 2009/0125366 | A1 | 5/2009 | Chakraborty et al. |
| 2009/0177957 | A1 | 7/2009 | Bouillet et al. |
| 2009/0249370 | A1 | 10/2009 | Liu et al. |
| 2009/0265718 | A1 | 10/2009 | Liu et al. |
| 2010/0293043 | A1* | 11/2010 | Atreya et al. ........... 705/14.4 |
| 2011/0078285 | A1 | 3/2011 | Hawkins et al. |

OTHER PUBLICATIONS

Title: Reliability data collection and analysis system, author: Groen et al, source: IEEE, dated: Aug. 24, 2004.*
Sheshagiri et al., "A Planner for Composing Services Described in DAML-S", ACM 2003, pp. 1-5.
Akkiraju et al., "SEMAPLAN: Combining Planning with Semantic Matching to Achieve Web Service Composition", American Association for Artificial Intelligence 2005, pp. 1-8.
D. Hinchcliffe, "A bumper crop of new mashup platforms", http://blogs.zdnet.com/Hinchcliffe/?p=111&tag=nl.e622, dated: Jul. 23, 2007.
Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006.
Zhen Liu, Anand Ranganathan and Anton Riabov, "A Planning Approach for Message-Oriented Semantic Web Service Composition", in AAAI-2007, dated: 2007.
Marti Hearst, Design Recommendations for Hierarchical Faceted Search Interfaces, ACM SIGIR Workshop on Faceted Search, Aug. 2006.
A. Riabov, Z. Liu. Planning for Stream Processing Systems. In Proceedings of AAAI-05, dated: 2005.
Connor et al, "Key-key value stores for efficiently processing graph data in the cloud", IEEE, pp. 88-93, 2011.
Ma et al., "Mining web graphs for recommendations", IEEE, pp. 1-14, 2011.
Jiang et al., "XML RL update language: syntax and semantics", IEEE, pp. 810-816, 2010.
Comito et al., "Selectively based XML query processing in structured peer to peer networks", ACM IDEAS, pp. 236-244, 2010.
Lyritsis et al., "TAGs; Scalable threshold based algorithms for proximity computation in graphs", ACM EDBT, pp. 295-306, 2011.
Riabov et al., "Wishful Search: Interactive Composition of Data Mashups", Google 2008, pp. 775-784.
Habernal et al., "Active Tags for Semantic Analysis", Google 2008, pp. 69-76.
A. Riabov and Z. Liu,; "Scalable Planning for Distributed Stream processing Systems", In ICAPS '06, 2006.
E. Sirin and B. Pasia, "Planning for Semantic Web Sevices", In Semantic Web Sevices Workshop at 3rd ISWC, 2004.
K. Whitehouse, F. Zhao and J. Liu, Semantic Streams: a Framework for Composable Semantic Interpretation of Sensor Data, In EWSN '06, 2006.
M. Pistore, P. Traverso, P. Bertoli and A. Marconi, Automated Synthesis of Composite BPEL4WS Web Services., In ICWS, 2005.
Baird, R.; Hepner, M.; Jorgenson, N.; Gamble, R., "Automating Preference and Change in Workflows," Seventh International Conference on Composition-Based Software Systems (Feb. 25-29, 2008), pp. 184-193 [retrieved http://ieeexplore.ieee.org/stamp/stamp.jsp?tp=&arnumber=4464023&isnumber=4463987].
Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltext.pdf].
Peer, J., "Web Service Composition As AI Planning—A Survey", (2005) [retrieved from http://decsai.ugr.es/~farco/CDoctorado/bibliografia/refPlanning4SW/LilnkedDocuments/webservice-composition-as-aiplanning-pfwsc.pdf].
Hepner, M., "Dynamic Changes to Workflow Instances of Web Services," (2007), University of Tulsa, [retrieved from http:/www.seat.utulsa.edu/papers/Hepner07-Dissertation.pdf].
A. Stentz, The Focused D* Algorithm for Real-Time Replanning (IJCAI-1995).
Narayanan, S., and McIlRaith, S. 2002, Simulation, verification and automated composition of web services, in WWW'02.
Traverso, P., and Pistore, M. 2004, Automated composition of semantic web sevices into executable processes, in ISWC'04.

Heinlein, C. "Workflow and Process Synchronization with Interaction Expressions and Graphs", 2001, IEEE, p. 243-252.

Bohannon et al, "Optimizing view queries to ROLEX to support navigable results trees", ACM, pp. 1-12, 2002.

Camilo Rostoker, Alan Wagner, Holger Hoos, "A Parallel Workflow for Real-time Correlation and Clustering of High-Frequency Stock Market Data", (Mar. 26-30, 2007), Parallel and Distributed Processing Symposium, 2007, IPDPS 2007. IEEE International pp. 1-10 [retrieved from http://ieeexplore.ieee.org/stamp/stamp.jsp?tp=&arnumber=4227944&isnumber=4227918].

Rana et al., An XML Based Component Model for Generating Scientific Applications and Performing Large Scale Simulations in a Meta-computing Environment, Google 2000, pp. 210-224.

Santos-Neto et al., Tracking Usage in Collaborative Tagging Communities, Google 2007, pp. 1-8.

Li et al. Collaborative Tagging Applications and Approaches, IEEE Sep. 2008, pp. 1-8 (14-21).

* cited by examiner

METHOD OF RECOVERING FROM SOFTWARE FAILURES USING REPLANNING

RELATED APPLICATIONS

This application is related to commonly assigned U.S. application Ser. No. 11/872,385, filed Oct. 15, 2007, commonly assigned U.S. application Ser. No. 11/970,262, filed Jan. 7, 2008, and commonly assigned U.S. application entitled, "METHOD AND SYSTEM FOR MODELING USER REQUESTS, APPLICATIONS AND COMPONENTS USED IN DYNAMIC APPLICATION ASSEMBLY", filed concurrently herewith, the disclosures of which are all incorporated by reference herein in their entirety.

BACKGROUND OF THE INVENTION

1. Technical Field

The present invention relates to event handling in compositional applications, and more particularly, to using replanning to react to events by reconfiguring deployed applications based on information obtained through event notifications.

2. Discussion of the Related Art

Significant time and cost savings in software development can be achieved by the reuse of components. Reuse is typically achieved by defining an interface of a component, implementing components that support the interface, and then, creating an application by connecting components with compatible externalized interfaces. This allows reuse of the same component code in different applications. The connections between the components (e.g., "bindings" of the components) can be established by connecting providers and consumers of an interface statically at the time of compiling an application, dynamically at application startup, or dynamically while running the application.

Dynamic binding of components enables a shorter cycle of application development. Dynamic binding has been popularized by scripting languages such as Ruby, and dynamic building frameworks developed for JAVA™, such as Spring, OSGi Service Platform and IBM Assemble Zero. Dynamic binding is extremely useful in distributed systems, where components or sources run on remote sites, and the clients may not be able to recompile components to establish the bindings. Some examples of reuse achieved through dynamic binding of externalized interfaces in distributed systems are Web Services, Grid, Stream Processing and systems for online processing of syndication feeds (e.g., YAHOO™ Pipes and/n sofware's RSSBus).

Automatic Application Composition Using Planning

Automated planning can be used to create composite applications in compositional architectures, such as web services, and stream processing. The applications are processing graphs composed of smaller modular components, such as service invocations, or other (smaller) processing graphs.

In many scenarios the components are service invocations (such as web service invocations or an invocation of a method of a JAVA™ class), and can be described in terms of their data effects and preconditions. In particular, we assume that a description (such as WSDL or JAVA™ object code with optional metadata annotations) of each service specifies the input requirements of the service (such as data type, semantics, access control labels, etc.). We refer to these input requirements as preconditions of service invocation, or simply preconditions. The description also specifies the effects of the service, describing the outputs of the service, including information such as data type, semantics, etc. In general, a service description may describe outputs as a function of inputs, so that the description of the output can only be fully determined once the specific inputs of the service have been determined. Note that in practical implementations the invocations can be synchronous, such as subroutine or RPC calls, or asynchronous, such as asynchronous procedure calls, message exchange or message flow.

Under these assumptions, an automated planner can be used to automatically assemble processing graphs based on a user-provided description of the desired output of the application. The descriptions of the components are provided to the planner in the form of a domain description. The planner can also take into account the specification of available primal inputs to the processing graphs, if not all inputs are available for a particular planning request.

The planner composes processing graphs by connecting components, starting from the primal inputs. It evaluates possible combinations of components, by computing descriptions of component outputs, and comparing them to preconditions of components connected to the output. More than one component input can be connected to one component output or one primal input. Logically, this amounts to sending multiple copies of data produced by the component output, with one copy sent to each of the inputs. In practical implementation these do not have to be copies, and it is possible to pass data by reference instead of by value. The process terminates when an output of a component (or a set of outputs taken together) satisfy the conditions specified in the user requirement. Note that all conditions are evaluated at plan time, before any applications are deployed or executed.

If multiple alternative compositional applications can be constructed and shown to satisfy the same request, the planner may use heuristics and utility functions to rank the alternatives and selected preferred plans.

The application, i.e., the processing graph, once composed, is deployed in an execution environment and can be executed.

Examples of a planner and an execution environment are described in Zhen Liu, Anand Ranganathan and Anton Riabov, "A Planning Approach for Message-Oriented Semantic Web Service Composition", in AAAI-2007.

Similar work has been done in the contexts of Stream Processing, Web Services and Grid Computing.

The components comprising the application can fail. This is a problem in usage scenarios where the components are implemented by web services, which are distributed. Access network failures, as well as denial of service attacks or software failures may cause individual web services to stop functioning.

Event Notification

Event and notification systems, such as JMS (JAVA™ Message Service,) are a common design pattern used in software engineering. These systems are used when one software component needs to be notified of the changes in other components. Similarly, in database management systems, such as IBM DB2, triggers can be defined in order to react to changes in the data.

Event handler procedure code, in practice, can become very complex and difficult to write and maintain, depending on the application. In compositional applications often no single component has access to interfaces and/or information required to handle events correctly. This is largely due to the fact that the components are designed to be reusable in multiple applications, but event handling procedures differ between applications.

SUMMARY OF THE INVENTION

In an exemplary embodiment of the present invention, a method for recovering from software failures, comprises: receiving failure information that identifies a failing component of a first processing graph; modifying a planning domain that includes a plurality of component descriptions according to the failure information; and composing a second processing graph by using the modified planning domain so that the second processing graph does not include the failing component.

The method further comprises: deploying the second processing graph in an execution environment; and executing the second processing graph.

The method further comprises providing a result of the executed second processing graph if a failing component is not identified during the execution of the second processing graph.

If a component of the first processing graph did not fail and it produced an output, the method further comprises composing the second processing graph by using the output.

After receiving the failure information and prior to composing the second processing graph, the method further comprises: determining an end state of the executed first processing graph; generating a planning task based on the determined end state, consistent state, recovery action and state modification descriptions for each component in the first processing graph; generating a recovery plan according to the planning task; and performing a recovery action included in the recovery plan.

The first processing graph is composed for a request. The request is a set of tags.

The second processing graph is composed by generating and solving a planning task, the planning task including the modified planning domain and the request, the second processing graph satisfying the request. The planning task is expressed in Stream Processing Planning Language (SPPL).

In an exemplary embodiment of the present invention, a method for recovering from software failures, comprises: receiving a set of tags specifying a user request; generating a processing graph by using a domain description that includes a plurality of component descriptions, the processing graph including a plurality of components that satisfy the request; deploying the processing graph in an execution environment; storing the user request; and invoking the processing graph to retrieve a response, wherein if a component of the processing graph fails: obtaining failure information identifying the failed component; removing the failed component description from the domain description; generating an alternative processing graph by using the modified domain description, the alternative processing graph including a plurality of components that satisfy the request; deploying the alternative processing graph in the execution environment; invoking the alternative processing graph; and providing a result of the executed second processing graph if a failing component is not identified during the execution of the second processing graph.

In an exemplary embodiment of the present invention, a computer readable medium tangibly embodying a program of instructions executable by a processor to perform method steps for recovering from software failures, the method steps comprising: receiving failure information that identifies a failing component of a first processing graph; modifying a planning domain that includes a plurality of component descriptions according to the failure information; and composing a second processing graph by using the modified planning domain so that the second processing graph does not include the failing component.

The method steps further comprising: deploying the second processing graph in an execution environment; and executing the second processing graph.

The method steps further comprising providing a result of the executed second processing graph if a failing component is not identified during the execution of the second processing graph.

If a component of the first processing graph did not fail and it produced an output, the method steps further comprise composing the second processing graph by using the output.

After receiving the failure information and prior to composing the second processing graph, the method steps further comprise: determining an end state of the executed first processing graph; generating a planning task based on the determined end state, consistent state, recovery action and state modification descriptions for each component in the first processing graph; generating a recovery plan according to the planning task; and performing a recovery action included in the recovery plan.

The first processing graph is composed for a request. The request is a set of tags.

The second processing graph is composed by generating and solving a planning task, the planning task including the modified planning domain and the request, the second processing graph satisfying the request. The planning task is expressed in SPPL.

In an exemplary embodiment of the present invention, a computer readable medium tangibly embodying a program of instructions executable by a processor to perform method steps for recovering from software failures, the method steps comprising: receiving a set of tags specifying a user request; generating a processing graph by using a domain description that includes a plurality of component descriptions, the processing graph including a plurality of components that satisfy the request; deploying the processing graph in an execution environment; storing the user request; and invoking the processing graph to retrieve a response, wherein if a component of the processing graph fails: obtaining failure information identifying the failed component; removing the failed component description from the domain description; generating an alternative processing graph by using the modified domain description, the alternative processing graph including a plurality of components that satisfy the request; deploying the alternative processing graph in the execution environment; invoking the alternative processing graph; and providing a result of the executed second processing graph if a failing component is not identified during the execution of the second processing graph.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Provided herein is a method for handling exceptions in execution of a composed application by replanning according to an exemplary embodiment of the present invention. In this method, when execution of the application fails, a planner is notified about the failure. Failure information, obtained from an execution environment, is then used to create an alternative plan. In one embodiment, an exception handler procedure can be included in the application to notify the planner and initiate replanning. If possible, intermediate results produced by the application before the failure are used after the failure is repaired by replanning.

Some benefits of this approach are that it: 1) helps to recover automatically from many possible failure states, while preserving semantics of the adapted workflow under possible failures (within the semantic model of the workflow); and 2) simplifies handling of error conditions by providing a universal error handler, that is automatically customized from the context of the invocation.

In one embodiment, execution of each component can have other effects, in addition to producing outputs. For example, it may lead to state changes, such as withdrawing funds from bank accounts, etc. In one embodiment, a recovery procedure is first generated and applied as part of the replanning process. The procedure is also generated using automated planning, where preconditions and effects of each component are initially described before the applications are composed or deployed, by generating the recovery procedure via generating a plan that makes the transition from a failed state to a consistent state.

The system described in commonly assigned U.S. application Ser. No. 11/872,385, filed Oct. 15, 2007 is comprised of a planner and an execution environment and is herein extended to include a replanning service and a request library.

Figure 1:
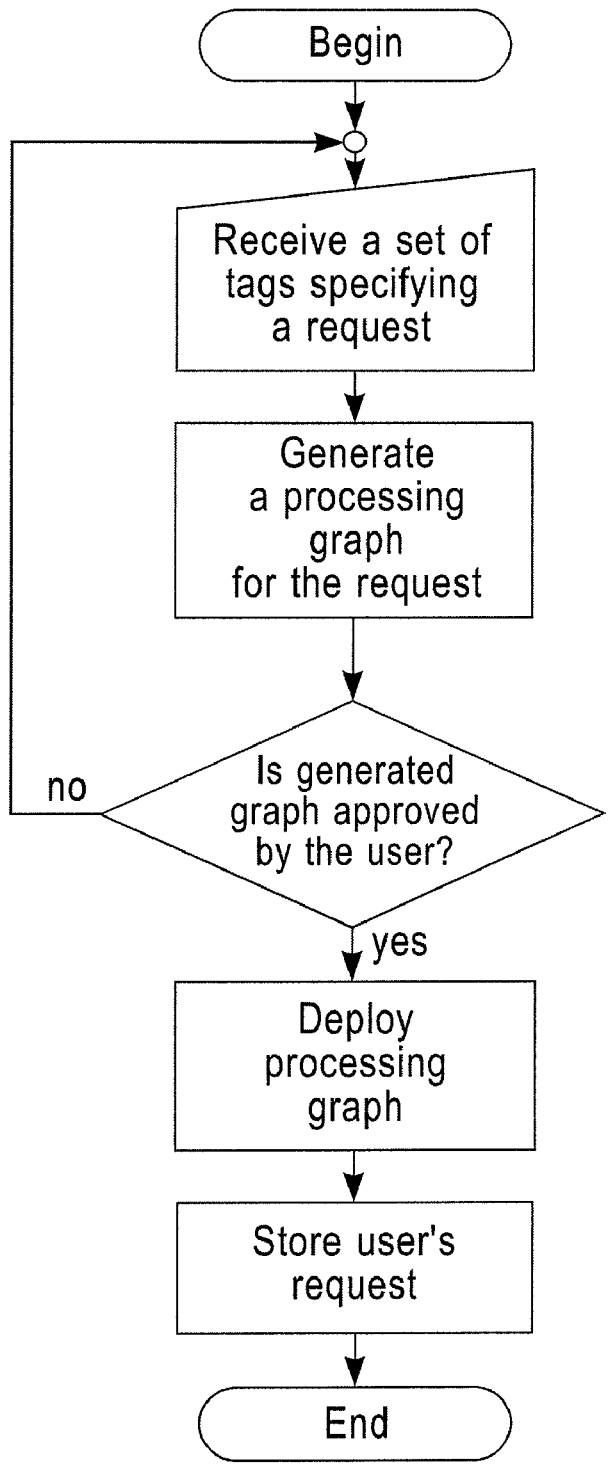
FIG. 1 is a flowchart illustrating a process of generating and deploying a flow according to an exemplary embodiment of the present invention.

The system operates as follows. One or more processing graphs are composed by the planner, and deployed to the execution environment. The requests, for which the processing graphs were composed, are stored in a request library. A flowchart of this process is shown in FIG. 1.

A brief discussion of generating processing graphs for user requests/specified goals is now provided.

Generating Processing Graphs for Specified Goals

In one embodiment, goals are represented using SPPL predicates, and descriptions of components and feeds are represented as SPPL actions, with preconditions and effects corresponding to annotations on inputs and outputs of these actions. The task of generating the processing graph is accomplished by invoking an SPPL planner to generate the highest quality plan for the specified set of actions and the goal. The plan produced by the SPPL planner can then be translated trivially into a processing graph, by mapping action instances included in the plan to instances of corresponding components in the processing graph, and establishing connections between component instances accordingly. It is also possible that the SPPL planner does not find any plans satisfying the goal. In this case, the planner reports an error condition, which is reflected in a user interface and the processing graph is not generated.

To represent descriptions of components and feeds in SPPL, an SPPL domain description must be created. The file containing the SPPL domain description is part of the system configuration, and is not changed when new user-defined goals are processed. For example, consider the following SPPL planning domain definition:

```
(define (domain Example)
   (:types
       _Source
       News - _Source
       Opinion - _Source
       Newspaper - News
       NewYorkTimes - Newspaper
       (NYTOpinion - NewYorkTimes Opinion)
       _Language
       InEnglish - _Language
       InFrench - _Language )
   (:constants
       NYTOpinion - NYTOpinion
       InEnglish - InEnglish
       InFrench - InFrench )
   (:predicates
       (source ?x - _Source)
       (language ?x -_Language) )
     (:action NYTOpinionFeed
       :cost(-1000 1)
       :effect [a_OUTPUT] (and
         (source NYTOpinion)
         (language InEnglish) )
   )
   (:action TranslateEnFr
     :parameters(?Source - _Source)
     :cost(-5 1)
     :precondition[a_INPUT] (and
        (source ?Source)
        (language InEnglish) )
     :effect[a_OUTPUT] (and
        (source ?Source)
        (language InFrench) )
   )
)
```

This domain description defines several types that correspond to tags, such as 'News' and 'InEnglish', which are typed constants of several of the types, two predicates, 'source' and 'language' and two actions, 'NYTOpinionFeed' and 'TranslateEnFr'. The two actions describe, correspondingly, an RSS feed downloadable from New York Times website and a component performing language translation from English to French. The cost vectors of actions specified in the ':cost' statements are used to compute a multi-dimensional cost value of the plan, which is computed according to SPPL rules, i.e., by component-wise addition of cost vectors. The effect of the 'NYTOpinionFeed' action describes the corresponding feed using a ground formula expressed with predicates and constants. Similarly, the effect of the translation component describes the output of the component. However, action 'TranslateEnFr' has a parameter ?Source of type Source, which is used in the expressions defining the precondition and the effect. According to SPPL rules this indicates that the output of the component is related to the same source with (source ?Source) predicate as its input, as translation operator does not affect the source of the feed. SPPL requires that in valid plans all action parameters are bound to specific values and that all preconditions are satisfied with the descriptions of connected streams. Port names, e.g., [a_OUTPUT], are used to assign conditions to specific input and output ports and avoid ambiguity for components that have more than one input or more than one output.

The SPPL description of the goal is generated for the user-specified goal (i.e., set of tags), by matching tags specified in the goal to type names and including into the SPPL goal expression all predicates that have parameters of corresponding type or a super-type of the corresponding type. For example, for a goal specified as 'Newspaper inFrench' the generated SPPL goal description will be:

```
(define (problem ExampleGoal)
(:domain Example)
(:goal
 :parameters(?x - Newspaper ?y - InFrench)
 :precondition
  (and
    (source ?x)
    (language ?y)
  ) )
(:objective –1 0)
(:bound 1000000 40)
)
```

Here we have extended the traditional SPPL with a parametric goal—in original SPPL the goals do not have parameters and must be specified as ground formulas. The parametric goal is interpreted similarly to a parametric action without effects, i.e., the goal is considered satisfied when the precondition is satisfied with at least one assignment of parameter values. The output of the SPPL planner is a plan. In the example described above, the SPPL planner output is:

```
<planset>
<plangraph
    problem="ExampleGoal"
    objective="1005"
    cost="-1005,2">
  <node id="0" name="NYTOpinionFeed">
    <port name="a_OUTPUT">
      <a name="language"><p>InEnglish</p></a>
      <a name="source"><p>NYTOpinion</p></a>
    </port>
  </node>
  <node id="1"
name="TranslateEnFr"><p>NYTOpinion</p>
    <port name="a_OUTPUT">
      <a name="language"><p>InEnglish</p></a>
      <a name="language"><p>InFrench</p></a>
      <a name="source"><p>NYTOpinion</p></a>
    </port>
  </node>
  <node id="2" name="Goal_0">
    <p>NYTOpinion</p><p>InFrench</p>
    <port name="g0">
      <a name="-Goal_0"/>
      <a name="language"><p>InEnglish</p></a>
      <a name="language"><p>InFrench</p></a>
      <a name="source"><p>NYTOpinion</p></a>
    </port>
  </node>
  <link fromNode="0" fromPort="a_OUTPUT"
       toNode="1" toPort="a_INPUT"/>
  <link fromNode="1" fromPort="a_OUTPUT"
       toNode="2" toPort="Port1"/>
  <link fromNode="2" fromPort="g0"
       toNode="-2" toPort="_goal"/>
</plangraph>
</planset>
```

The planner output describes a processing graph that consists of an instance of NYTOpinionFeed with the single output of that feed connected to the single input of Translater-EnFr component, with the single output of that component connected to the goal, i.e., the final output of the plan.

This processing graph description is subsequently translated into a processing graph description recognized by the execution environment, and can then be deployed for execution.

At run time, if a failure occurs at one of the components, the replanning service receives a failure notification from the execution environment. The failure information includes information identifying the failed component.

The received information is used in replanning. Replanning is carried out by modifying a domain description and activating the planner (immediately when the failure occurs, at regular intervals, or on user request) to re-evaluate the planning request stored in the request library. If the resulting applications produced by the planner for the requests are different from those previously produced and deployed, the deployed applications are reconfigured to match the new compositions, or re-deployed, replacing the old composition with the new. The process of recovering from failures using replanning is described by the flowchart shown in FIG. 2.

The step of deploying the alternative processing graph above can also involve presenting a user with the new compositions for previously submitted requests, and requesting the user to make a decision about replacing the deployed composition with one of the newly produced compositions.

In one embodiment, the replanning is performed by first removing the failed component from the description of the planning domain, and then planning the original request corresponding to the failed processing graph thus avoiding the use of the failed component in the new processing graph.

Figure 2:
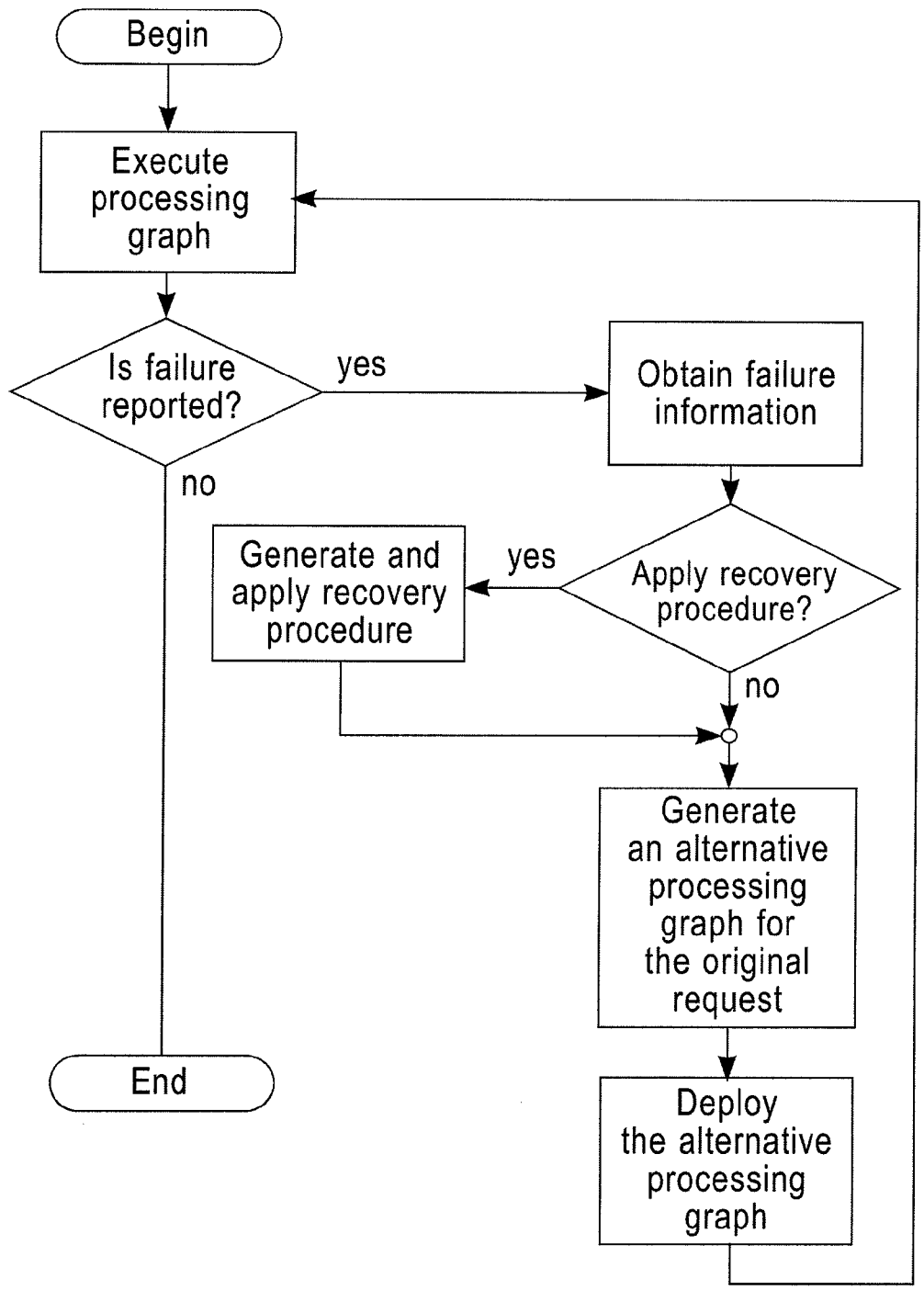
FIG. 2 is a flowchart illustrating a process of recovering from failures using replanning according to an exemplary embodiment of the present invention.
Figure 3:
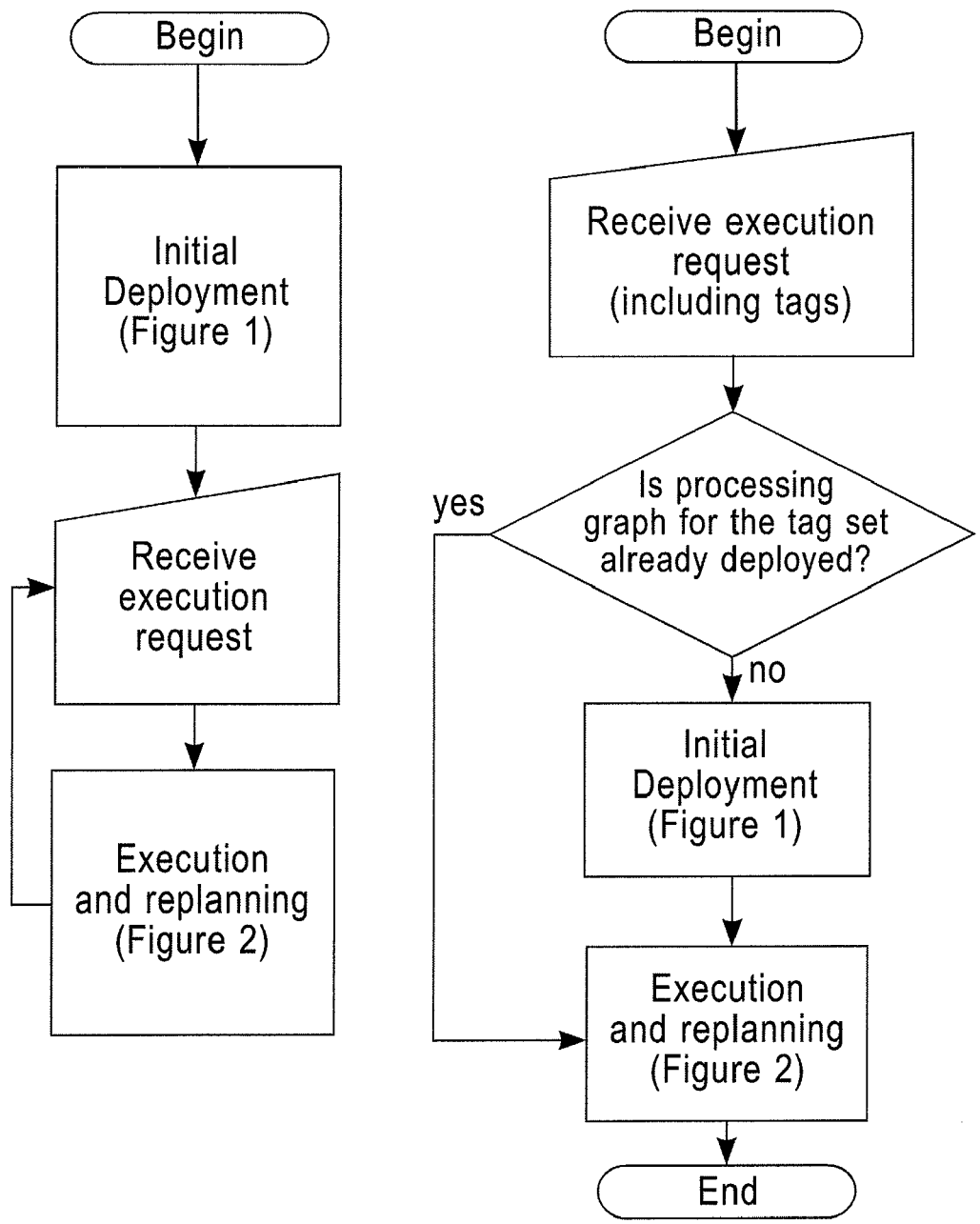
FIG. 3 is a pair of flowcharts illustrating two scenarios in which recovery can be used according to an exemplary embodiment of the present invention.

The flowcharts shown in FIG. 3 describe two possible scenarios in which the recovery procedure can be used. In the flowchart on the left, the initial deployment process is performed as shown in FIG. 1. Following that, each time a request for execution is retrieved, it is processed as shown in FIG. 2 and described above. Alternatively, in the flowchart on the right, each execution request may include the tag set. In that case, if there is a processing graph deployed for the tag set, the execution of the processing graph and possible replanning proceeds as shown in FIG. 2. Otherwise, if the graph is not yet deployed, it is first created and deployed as shown in FIG. 1, and after that the process shown in FIG. 2 is used to execute and possibly recover from failures.

Replanning

Consider the following set of components:

```
service ShippingProvider1Pricing {
  quality{1.0}
  input[from]{_FromZipCode}
  input[to]{_ToZipCode}
  output{ShippingCost}
}
service ShippingProvider2Pricing {
```

```
quality{1.0}
input[from]{_FromZipCode}
input[to]{_ToZipCode}
output{ShippingCost}
}
service ShippingProvider3Pricing {
quality{1.0}
input[from]{_FromZipCode}
input[to]{_ToZipCode}
output{ShippingCost}
}
service MinCost {
input[cost1]{ShippingCost}
input[cost2]{ShippingCost}
output{ Minimum ShippingCost }
}
```

For this example, we will assume that these component descriptions describe web services. The first three web services compute shipping cost between two zip codes for three commercial shipping services. The last service computes the minimum cost of shipping between two costs.

Figure 4:
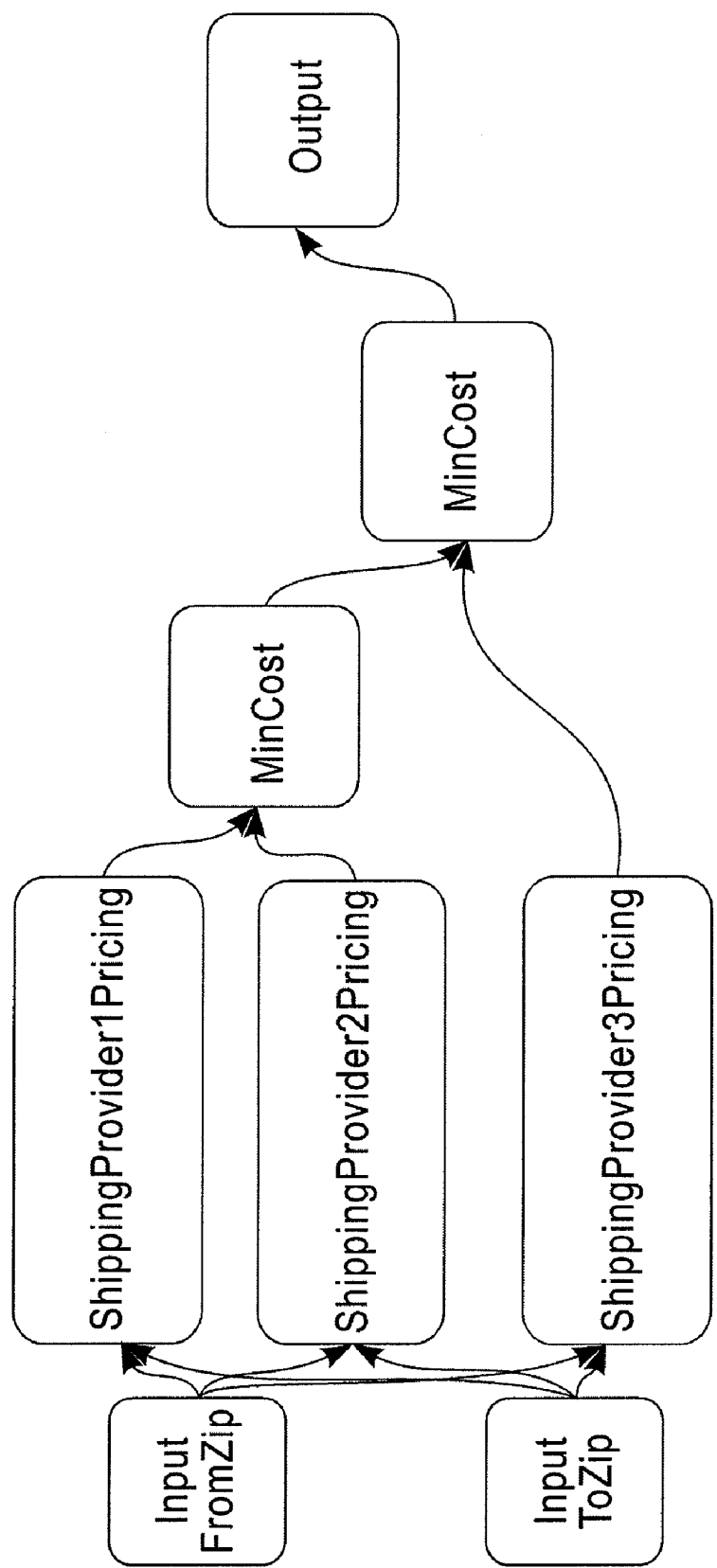
FIG. 4 is a graphical representation of a processing graph obtained according to an exemplary embodiment of the present invention.

A processing graph generated for these descriptions, as described in commonly assigned U.S. application Ser. No. 11/872,385, filed Oct. 15, 2007, is graphically shown in FIG. 4.

Assume that this processing graph is deployed in an execution environment, and that the request (i.e., {Shipping Cost}) is saved in a request library. One possible execution environment is IBM Project Zero. The resulting service will return a minimum shipping cost over the three providers.

Consider the scenario where the web service that computes the shipping cost for provider 2 failed. We will now describe how the system will recover from this failure. When the composed application is invoked, the failure will be detected. After the failure is detected, it can be recovered automatically or upon user request. We will describe the scenario where the recovery is automatic.

In one embodiment, failure information received from the execution of the original composition contains the name of the component that failed. If that is the case, we remove the description of the failed component from the set of component descriptions used for planning, and request the planner to generate a new processing graph for the original request, i.e., {ShippingCost}. The set of components after modifying the planning domain by removing the failed service is the following:

```
service ShippingProvider1Pricing {
quality{1.0}
input[from]{_FromZipCode}
input[to]{_ToZipCode}
output{ShippingCost}
}
service ShippingProvider3Pricing {
quality{1.0}
input[from]{_FromZipCode}
input[to]{_ToZipCode}
output{ShippingCost}
}
service MinCost {
input[cost1]{ShippingCost}
input[cost2]{ShippingCost}
output{ Minimum ShippingCost }
}
```

Figure 5:
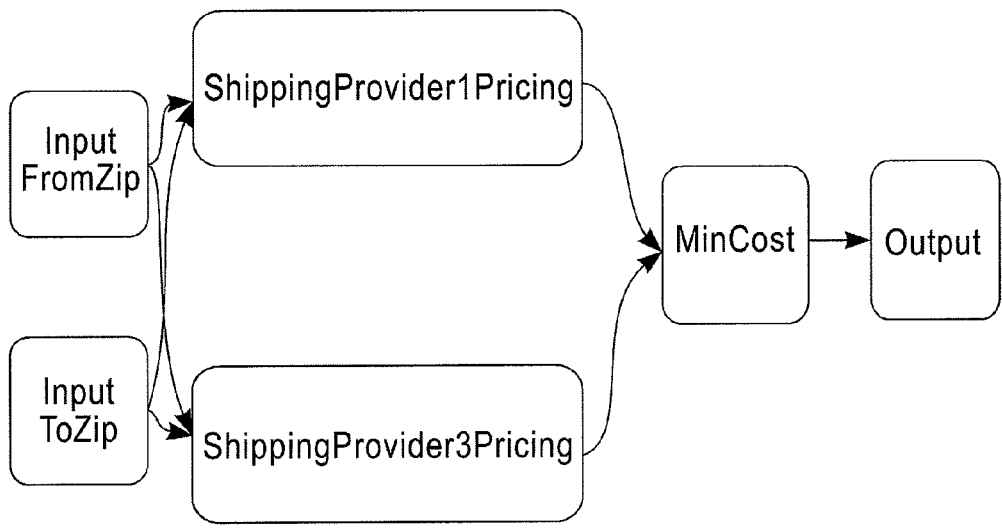
FIG. 5 is a graphical representation of a processing graph obtained by replanning with a modified planning domain according to an exemplary embodiment of the present invention.

The generated processing graph is shown in FIG. 5.

Finally, the new generated processing graph is deployed, replacing the failed processing graph, and the results of executing the new processing graph are returned to the user.

Replanning with Reuse of Partial Results

Components in the processing graph process data in partial order specified by the processing graph. Components that produce data complete producing the data before the components that consume the data start producing it. There is no specific order between components that do not have direct or indirect data dependencies. Therefore, it is possible that before the failure of ShippingProvider2Pricing service in the previous example, the output of ShippingProvider1Pricing in the graph of FIG. 4 has already been computed. This output is described by a set of tags associated with the output of the corresponding operator instance, and is known to the planner.

In one embodiment, the knowledge about intermediate data that were computed before failure-initiated replanning started, is used as primal data in planning. The following set of components is then used for replanning in our example:

```
service SP1PricingData {
quality{1.0}
output{ShippingCost}
}
service ShippingProvider3Pricing {
quality{1.0}
input[from]{_FromZipCode}
input[to]{_ToZipCode}
output{ShippingCost}
}
service MinCost {
input[cost1]{ShippingCost}
input[cost2]{ShippingCost}
output{ Minimum ShippingCost }
}
```

Figure 6:
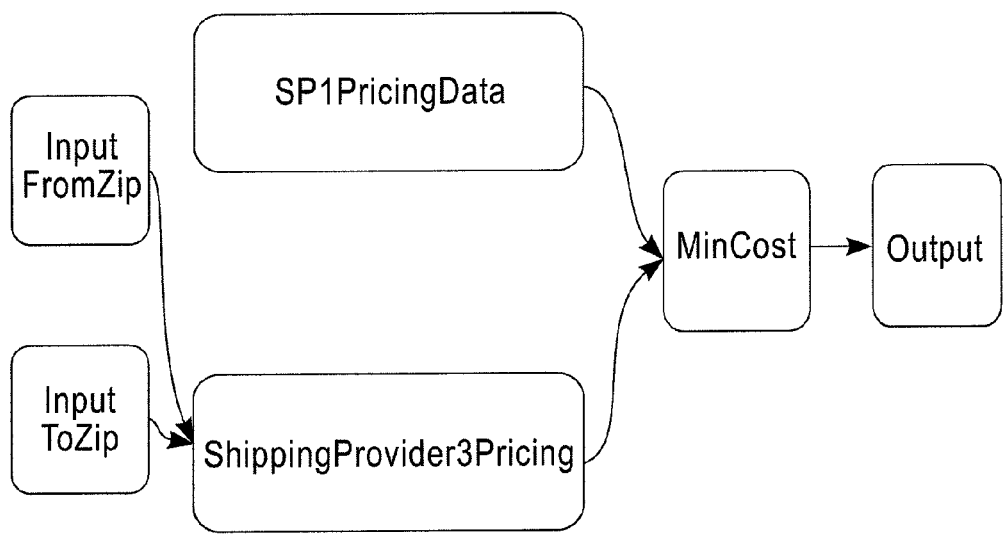
FIG. 6 is a graphical representation of a processing graph obtained by replanning using partial results according to an exemplary embodiment of the present invention.

The new component SP1PricingData represents the data that was partially computed during failed execution of the original processing graph. The new processing graph that uses these partial results is shown in FIG. 6.

Note that the partial results are computed with fixed values of input parameters, and therefore the processing graph that uses partial results of an earlier computation is no longer parametric. In this example, it will not work correctly if the user provides different values of source or destination zip codes. Hence, it can only be reliably used to respond to one request to the composed application. For the next request, the graph shown in FIG. 5 may need to be deployed. An alternative implementation is to deploy the original graph in FIG. 4 again, after responding to the failed request by completing the processing using the graph in FIG. 6. Then, during the next request, the same failure may occur, after which the recovery procedure will have to be repeated.

A benefit of this approach is in reducing the number of calls to services made during recovery. In particular, in the previous example ShippingProvider1Pricing will be called twice during recovery, while in the method described here it is only called once.

Replanning with Recovery Procedure

A failure may leave the application in an inconsistent state, if a transaction that had to be performed by the application does not complete.

For example, consider a processing graph for a money transfer transaction consisting of two components, where the first component is configured to withdraw $100 from account A, and the second to deposit the same amount to account B. Assume now that during execution of the processing graph the second service call fails, for example, because the bank of account B is performing maintenance of a web service infrastructure. This leaves the system in an inconsistent state, i.e., account B did not receive the money, which had already left account A, so it may mean that $100 is lost. Thus, before the second attempt to deploy and run the processing graph is made, a recovery procedure must be carried out. In this case, the recovery procedure is to deposit $100 back into account A.

The planner can be used to generate a recovery procedure that is applied before an alternative processing graph is generated to replace the original graph, so that the execution of the alternative processing graph starts in a consistent state. The definition of a consistent state is given using predicates describing the state of the application. PDDL (Planning Domain Description Language) predicates are used to describe the state, and specify the goal describing a consistent state. The descriptions of services are extended to include the add/remove lists of predicates that describe changes to the state performed by the services. Finally, recovery actions are described. The set of recovery actions constitutes a planning domain for planning the recovery procedure, and the planning goal is generated according to the description of a consistent state. In one embodiment, a PDDL planner, for example FF, can be used to generate a plan for recovery.

Consider the following set of service descriptions:

```
service ShippingProvider1Pricing {
quality{1.0}
input[from]{_FromZipCode}
input[to]{_ToZipCode}
output{ShippingCost}
effect{ ( requested provider1) }
}
service ShippingProvider2Pricing {
quality{1.0}
input[from]{_FromZipCode}
input[to]{_ToZipCode}
output{ShippingCost}
effect{ (requested provider2) }
}
service ShippingProvider3Pricing {
quality{1.0}
input[from]{_FromZipCode}
input[to]{_ToZipCode}
output{ShippingCost}
effect{ (requested provider3) }
}
service MinCost {
input[cost1]{ShippingCost}
input[cost2]{ShippingCost}
output{ Minimum ShippingCost }
}
```

The description of each service includes an "effect" clause, describing the effects of executing the service. The effects are described as action effects in PDDL, i.e., by specifying predicates added to and removed from the global state description when the service is executed. When failure occurs, the end state of execution is determined by applying the effects (i.e., adding or removing predicates from the state) of all services that did run, in the order in which the services were run. It is assumed that there are no predicates in the initial state before any services run.

Assume that the services provided by the providers are such that requesting price information also requests a pickup. In the composed flow shown in FIG. 4, the Output component clears the state by canceling all pickup requests. However, if the ShippingProvider2Pricing fails, it is possible that provider 1 and/or 3 have already provided their quotes and scheduled pickups. Which providers have supplied the quotes will depend on the runtime environment, since no data dependencies exist that would enforce any order of requests in FIG. 4. However, the Output component will not process its input, since an upstream component has failed.

This is easily addressed by planning. According to the domain definition, we define an action UndoRequest as follows:

```
(:action UndoRequest
    :parameters (?provider)
    :precondition( (requested ?provider) )
    :effect( (not (requested ?provider) ))
)
``` and the consistency goal as:
(and (not (requested provider1)) (not (requested provider2))) (not (requested provider3)))

Assume now that when ShippingProvider2Pricing failure is detected, service ShippingProvider1Pricing did run, and therefore the quote has been requested, but ShippingProvider3Pricing did not run. This will result in an inconsistent state after failure, which can be described by predicates as:
(and (requested provider1))

It is easy to see that the state is inconsistent since it does not satisfy the goal formula. Using the inconsistent state as the initial state, and specifying the goal state as well as the set of recovery actions to describe a PDDL planning task, and invoking FF planner to generate a recovery plan, we obtain the plan consisting of a single action:
UndoRequest(provider1).

This generated recovery procedure can now be applied by performing procedures associated with this action before proceeding with recovery by deploying the alternative plan.

Figure 7:
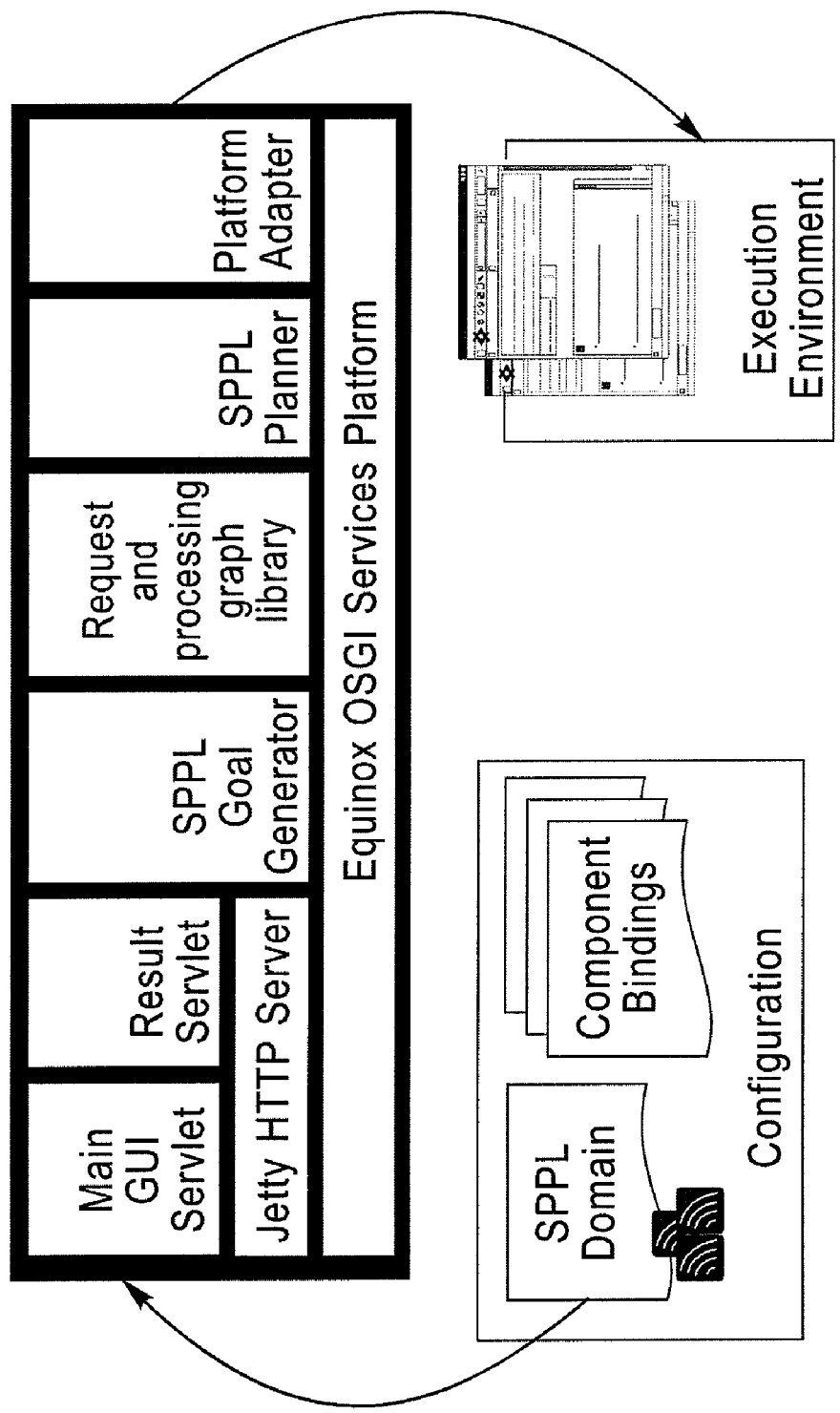
FIG. 7 illustrates the architecture of a system according to an exemplary embodiment of the present invention.

FIG. 7 shows an example architecture of the system. The system consists of several modules implemented as OSGi services deployed on an Eclipse Equinox implementation of an OSGi platform. The GUI is implemented by two servlets, the Main GUI Servlet that generates a user interaction screen and the Results Servlet that generates a "preview of results" screen.

Jetty web server, integrated with OSGi platform, is used to host the servlets. SPPL Goal Generator service generates SPPL goal descriptions based on a user-specified set of tags submitted via the Main GUI Servlet.

SPPL Planner service invokes an SPPL planner to process the generated goal and generate a processing graph. Examples of a planner and an execution environment are described in Zhen Liu, Anand Ranganathan and Anton Riabov, "A Planning Approach for Message-Oriented Semantic Web Service Composition", in AAAI-2007, the disclosure of which is incorporated by reference herein in its entirety.

Request and processing graph library stores the requests received from the user, and the processing graphs that were composed and deployed for these requests. Stored requests are used by the platform adapter service to initiate replanning when failures are detected. These requests are used during replanning as planning goals that are processed by the planner in the planning domain modified as a result of failure.

The Platform Adapter service translates the processing graph produced by the SPPL planner to the format recognized by the target execution environment. The Platform Adaptor service can also include procedures for deploying the translated processing graph in the target execution environment, for invoking the deployed processing graph and retrieving results of its execution, and for generating a preview of results received from the processing graph. Platform adapter module also detects execution failure, initiates replanning and performs the recovery procedure when necessary.

The system is configured by providing an SPPL domain description that includes descriptions of all service components and primal data, and optionally a set of component bindings. The component bindings are files used by the platform adapter to generate a platform-specific representation of the processing graph. The component bindings are typically represented as templates, with one template provided for each component, with placeholders that are filled in by the platform adapter to represent connections between components in generated processing graphs.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for recovering from software failures, comprising:
   receiving failure information that identifies a failing component of a first processing graph;
   modifying a planning domain that includes a plurality of component descriptions according to the failure information;
   composing using a processor of a computer, a second processing graph by using machine code executable by the computer to process the modified planning domain, wherein the method further comprises:
   deploying the second processing graph in an execution environment;
   executing the second processing graph; and
   providing a result of the executed second processing graph if a failing component is not identified during the execution of the second processing graph.

2. The method of claim 1, wherein if a component of the first processing graph did not fail and it produced an output, the method further comprises: composing the second processing graph by using the output.

3. The method of claim 1, wherein after receiving the failure information and prior to composing the second processing graph, the method further comprises:
   determining an end state of the executed first processing graph;
   generating a planning task based on the determined end state, consistent state, recovery action and state modification descriptions for each component in the first processing graph;
   generating a recovery plan according to the planning task; and performing a recovery action included in the recovery plan.

4. The method of claim 1, wherein the first processing graph is composed for a request.

5. The method of claim 4, wherein the request is a set of tags.

6. The method of claim 4, wherein the second processing graph is composed by generating and solving a planning task, the planning task including the modified planning domain and the request, the second processing graph satisfying the request.

7. The method of claim 6, wherein the planning task is expressed in Stream Processing Planning Language (SPPL).

8. A method for recovering from software failures, comprising:
   receiving a set of tags specifying a user request;
   generating, using a processor of a computer, a processing graph by using machine code executable by the computer to process a domain description that includes a plurality of component descriptions, the processing graph including a plurality of components that satisfy the request;
   deploying the processing graph in an execution environment;
   storing the user request; and
   invoking the processing graph to retrieve a response, wherein if a component of the processing graph fails:
   obtaining failure information identifying the failed component;
   removing the failed component description from the domain description;
   generating an alternative processing graph by using the modified domain description, the alternative processing graph including a plurality of components that satisfy the request;
   deploying the alternative processing graph in the execution environment; invoking the alternative processing graph; and
   providing a result of the executed alternative processing graph if a failing component is not identified during the execution of the alternative processing graph.

9. A non-transitory computer readable medium tangibly embodying a program of instructions executable by a processor to perform method steps for recovering from software failures, the method steps comprising:
   receiving failure information that identifies a failing component of a first processing graph;
   modifying a planning domain that includes a plurality of component descriptions according to the failure information;

composing a second processing graph by using the modified planning domain;
wherein modifying the planning domain includes removing the failing component's description from the planning domain,
wherein the method steps further comprise:
deploying the second processing graph in an execution environment; executing the second processing graph; and
providing a result of the executed second processing graph if a failing component is not identified during the execution of the second processing graph.

10. The computer readable medium of claim 9, wherein if a component of the first processing graph did not fail and it produced an output, the method steps further comprise:
composing the second processing graph by using the output.

11. The computer readable medium of claim 9, wherein after receiving the failure information and prior to composing the second processing graph, the method steps further comprise:
determining an end state of the executed first processing graph;
generating a planning task based on the determined end state, consistent state, recovery action and state modification descriptions for each component in the first processing graph;
generating a recovery plan according to the planning task; and
performing a recovery action included in the recovery plan.

12. The computer readable medium of claim 9, wherein the first processing graph is composed for a request.

13. The computer readable medium of claim 12, wherein the request is a set of tags.

14. The computer readable medium of claim 12, wherein the second processing graph is composed by generating and solving a planning task, the planning task including the modified planning domain and the request, the second processing graph satisfying the request.

15. The computer readable medium of claim 14, wherein the planning task is expressed in Stream Processing Planning Language (SPPL).

16. A non-transitory computer readable medium tangibly embodying a program of instructions executable by a processor to perform method steps for recovering from software failures, the method steps comprising:
receiving a set of tags specifying a user request;
generating a processing graph by using a domain description that includes a plurality of component descriptions, the processing graph including a plurality of components that satisfy the request;
deploying the processing graph in an execution environment; storing the user request;
invoking the processing graph to retrieve a response, wherein if a component of the processing graph fails:
obtaining failure information identifying the failed component;
removing the failed component description from the domain description;
generating an alternative processing graph by using the modified domain description, the alternative processing graph including a plurality of components that satisfy the request;
deploying the alternative processing graph in the execution environment; invoking the alternative processing graph; and
providing a result of the executed alternative processing graph if a failing component is not identified during the execution of the alternative processing graph.

* * * * *